Patented Feb. 9, 1954

2,668,820

UNITED STATES PATENT OFFICE 2,668,820

BIS(ETHYLXANTHOYLTHIOXY)-METHYL-PHOSPHINE OXIDE

Henry Tolkmith, Midland, Mich., assignor to The Dow Chemical Company, Midland, Mich., a corporation of Delaware No Drawing. Application April 21, 1953, Serial No. 350,233

1 Claim. (Cl. 260—455)

The present invention is directed to bis(ethylxanthoylthioxy)-methyl-phosphine oxide of the formula

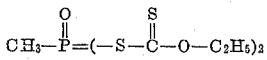

This compound is a viscous oil, somewhat soluble in many organic solvents and substantially insoluble in water. It is of value as an intermediate for the preparation of more complex phosphorus derivatives and as a toxic constituent of parasiticide compositions.

It may be prepared by reacting an alkali metal ethylxanthate with methanephosphonic dichloride of the formula

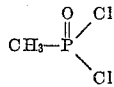

in an inert organic solvent such as benzene. Sodium ethylxanthate is preferably employed as the alkali metal xanthate reactant. In practice, good results are obtained when at least two molecular proportions of the xanthate are reacted with each molecular proportion of the methanephosphonic dichloride.

In carrying out the reaction, the methanephosphonic dichloride is added portionwise with stirring to the sodium ethylxanthate dispersed in the solvent and the resulting mixture thereafter heated for a period of time at a temperature of from 35° to 80° C. to complete the reaction. The reaction is somewhat exothermic and takes place smoothly at a temperature range of from 20° to 80° C. The temperature may be controlled by regulation of the rate of contacting the reactants, as well as by the addition and subtraction of heat, if required. Temperatures substantially in excess of 80° C. for any appreciable period of time should be avoided, as the desired product has a tendency to decompose at such temperature. Upon completion of the reaction, the mixture may be filtered and the filtrate distilled under reduced pressure at gradually increasing temperatures up to a temperature of 80° C. to separate low boiling constituents and to obtain as a residue the desired bis(ethylxanthoylthioxy)-methyl-phosphine oxide.

In a representative preparation, 25 grams (0.188 mole) of methanephosphonic dichloride (boiling at 163° C. at atmospheric pressure) dissolved in 100 milliliters of benzene was added portionwise with stirring to 68 grams (0.470 mole) of sodium ethylxanthate dispersed in 250 milliliters of benzene and the resulting mixture thereafter heated for 3 hours at a temperature of 50° C. to complete the reaction. The mixture was then filtered and the filtrate distilled under reduced pressure to a temperature up to 80° C. to obtain as a residue a bis(ethylxanthoylthioxy)-methyl-phosphine oxide product. The latter is a viscous oil having a refractive index $n/D$ of 1.4326 at 20° C.

The new bis(ethylxanthoylthioxy)-methyl-phosphine oxide product is effective as a parasiticide and adapted to be employed for the control of a wide range of agricultural and household pests such as flies, mites, aphids, beetles, cockroaches and Southern army worms. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 per cent by weight of the dust and in liquid suspensions from about 0.1 to 3 pounds per 100 gallons of the spray mixture. In representative operations against two-spotted spider mites and bean aphids, 100 per cent kills of these organisms were obtained with aqueous spray compositions containing 0.5 pound of the toxic phosphine oxide per 100 gallons of spray mixture.

This is a continuation in part of my copending application Serial No. 203,761, filed December 30, 1950.

I claim:

Bis(ethylxanthoylthioxy)-methyl-phosphine oxide.

HENRY TOLKMITH.

No references cited.